UNITED STATES PATENT OFFICE.

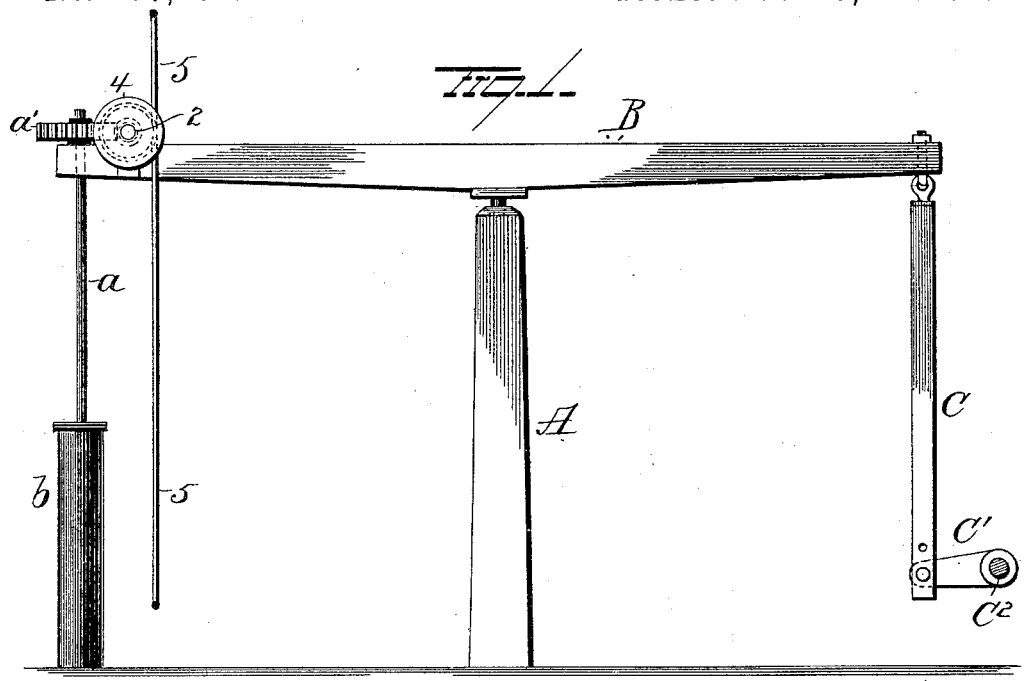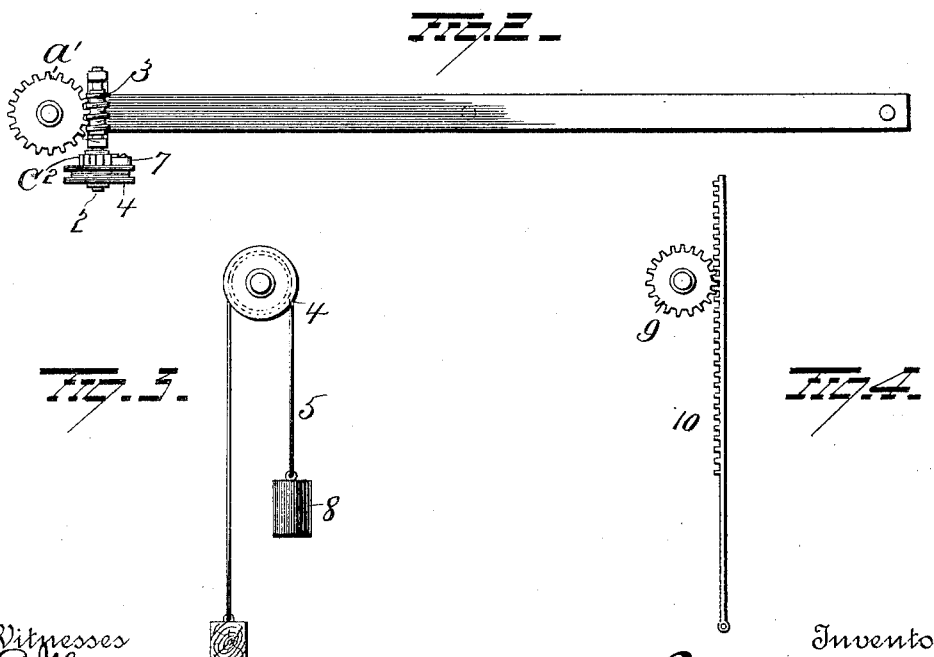

GEORGE ALLEN, OF FRANKLIN, PENNSYLVANIA.

OIL-WELL PUMPING APPARATUS.

SPECIFICATION forming part of Letters Patent No. 460,807, dated October 6, 1891.

Application filed June 29, 1891. Serial No. 397,825. (No model.)

*To all whom it may concern:*

Be it known that I, GEORGE ALLEN, a citizen of Franklin, in the county of Venango and State of Pennsylvania, have invented certain new and useful Improvements in Oil-Well Pumping Apparatus; and I do hereby declare the following to be a full, clear, and exact description of the invention, such as will enable others skilled in the art to which it appertains to make and use the same.

My invention relates to an improvement in oil-pumping apparatus.

Hitherto ratchet mechanism has been adapted for automatically rotating drill-rods as they are elevated and lowered in the process of drilling.

My present invention consists in worm-gearing, in connection with a polish-rod and walking-beam, and in certain other novel features of construction and combinations of parts, as will be hereinafter described, and pointed out in the claims.

With this object in view the invention consists in certain novel features of construction and combinations and arrangements of parts, as hereinafter set forth, and pointed out in the claims.

In the accompanying drawings, Figure 1 is an elevation illustrating my improvements. Fig. 2 is a plan view. Figs. 3 and 4 are views of modifications.

A represents a post or upright, upon the top of which a walking-beam B is mounted. At one end of the walking-beam a depending pitman C is connected. The lower end of the pitman C is connected to a crank-arm C', carried by a shaft $C^2$, which latter is adapted to be driven in any suitable manner. The other end of the beam is perforated for the reception of the polish-rod $a$, which latter is adapted to work through a tube $b$, as usual. Mounted on the polish-rod is a worm-wheel 1, and mounted on the walking-beam B, in proximity to this pinion, is a short shaft 2. The shaft 2 is provided with a worm or screw 3, adapted to mesh with the pinion or worm-wheel $a'$ on the polish-rod and impart motion thereto, as hereinafter explained. The shaft 2 also carries a loose pulley 4, having a peripheral groove for the reception of a cord 5, said cord being wound one or more times around the pulley and secured at its ends to a suitable support. A ratchet-wheel $C^2$ is fixed to the shaft 2, and pivoted to the pulley 4 is a dog 7, adapted to mesh with the teeth of the ratchet-wheel when the pulley 4 is rotated in one direction and ride over said teeth when the pulley is rotated in the reverse direction. From this construction it will be seen that as the walking-beam vibrates the polish-rod will have a rotary motion imparted to it automatically, thus preventing the adhesion of paraffine to the sucker-rod from impairing the proper operating of the apparatus.

In well-boring apparatus the sucker-rods are made in sections of about twenty-five feet and from twenty-five to seventy-five of these sections are used in each well. These frequently come unscrewed while working, causing much trouble to get them out. A slow rotation in the direction that they screw together would prevent this entirely. Again, where rods do not rotate portions of the iron joints wear constantly in one place against the inside of the tubing, wearing through the tubing at that point. A revolution of the rods will distribute this wear all around the inside of the tubing and prevent wearing. At the lower end of the sucker-rod is attached a working valve having leather cups working in a brass barrel. Sand or other hard substances frequently get between these cups and the working barrel and cut grooves in the barrel, causing it to leak and become worthless. A revolution of this valve will distribute this wear all around the inside of the barrel and prevent this grooving of the working barrel, making it wear much longer.

In lieu of the arrangement of pulley 4 and cord 5, above described, the arrangement shown in Fig. 3 may be employed, in which case one end of the cord is fastened to some part of the frame-work and at the other end a weight 8 is attached; or, if desired, the pulley 4 may be replaced by a pinion 9 and a rack-bar 10 substituted for the cord 5, adapted to mesh with the pinion 8, as shown in Fig. 4.

Having fully described my invention, what I claim as new, and desire to secure by Letters Patent, is—

1. In oil-well pumping apparatus, the combination, with a walking-beam and a polish-rod, of a worm-wheel carried by said polish-rod, means for vibrating said walking-beam, and means for rotating said worm-wheel and polish-rod in one direction, substantially as set forth.

2. The combination, with a walking-beam and means for vibrating the same and a polish-rod, of a worm-wheel carried by said polish-rod, a shaft mounted on the walking-beam, a worm on said shaft to mesh with the worm-wheel, and means for rotating said shaft automatically during the vibration of the walking-beam, substantially as set forth.

3. The combination, with a walking-beam, means for vibrating the same, and a polish-rod, of a worm-wheel carried by the polish-rod, a shaft mounted on said walking-beam, a worm carried by said shaft and adapted to mesh with the worm-wheel, a pulley carried by said shaft, and a cord passing over said pulley, whereby the polish-rod will be rotated during the vibration of the walking-beam, substantially as set forth.

4. The combination, with a walking-beam, means for vibrating the same, and a polish-rod, of a worm-wheel carried by the polish-rod, a shaft carried by the walking-beam, a worm on said shaft adapted to mesh with said worm-wheel, a pulley mounted loosely on said shaft, a cord passing around said pulley and secured at its ends, a ratchet-wheel secured to said shaft, and a dog pivoted to the pulley and adapted to engage the teeth of the ratchet-wheel when the pulley is rotated in one direction and ride over said teeth when said pulley is rotated in the other direction, whereby the polish-rod and sucker-rod will be rotated in one direction during the vibration of the walking-beam, substantially as set forth.

In testimony whereof I have signed this specification in the presence of two subscribing witnesses.

GEORGE ALLEN.

Witnesses:
W. T. BELL,
JOHN PATTERSON.